United States Patent [19]
Adams et al.

[11] Patent Number: 5,168,498
[45] Date of Patent: Dec. 1, 1992

[54] MOBILE COMMUNICATIONS SYSTEM

[75] Inventors: John L. Adams, Felixstowe; Vincent J. Skinner, Croydon, both of England

[73] Assignee: British Telecommunications public limited company, London, England

[21] Appl. No.: 520,221

[22] Filed: May 3, 1990

[30] Foreign Application Priority Data

May 3, 1989 [GB] United Kingdom ................ 8910085

[51] Int. Cl.$^5$ .......................... H04J 3/24; H04Q 4/00
[52] U.S. Cl. ................................ 370/95.1; 455/33.1; 370/94.1
[58] Field of Search ...................... 455/33, 69; 370/60, 370/94.1, 95.1, 95.3; 379/59, 60, 54

[56] References Cited

U.S. PATENT DOCUMENTS

| | | | |
|---|---|---|---|
| 4,916,691 | 4/1990 | Goodman | 370/60 |
| 4,932,049 | 6/1990 | Lee | 455/33 |

FOREIGN PATENT DOCUMENTS

| | | | |
|---|---|---|---|
| A48861 | 4/1982 | European Pat. Off. | |
| A366342 | 5/1990 | European Pat. Off. | |
| A3135231 | 4/1983 | Fed. Rep. of Germany | |
| A3211969 | 10/1983 | Fed. Rep. of Germany | |

OTHER PUBLICATIONS

British Telecommunications Engineering, Part 2 vol. 6, Jul. 87, London GB pp. 95-104; M./ Littlewood et al: "Network Evolution Using Asynchronous Time-Division Techniques".

IEEE Global Telecommunications Conference & Exhibition 28th Nov.-1st Dec. 1988 vol. 3, New York (US) pp. 1350-1354; H. Sekiguchi et al: "Digital Mobile Communications Switching".

British Telecommunications Engineering, Part 1 vol. 7, Apr. 88, London GB pp. 58-65; T. W. Johnson et al: "CCITT Signalling Systems No. 7: Transaction Capabilities".

IEEE Communications Magazine, vol. 25, No. 6, Jun. 87, New York (US) pp. 22-30; E. S. K. Chien et al: "Cellular Access Digital Network (CADN): Wireless access to networks of the future".

*Primary Examiner*—Benedict V. Safourek
*Assistant Examiner*—T. Ghebretinsae
*Attorney, Agent, or Firm*—Nixon & Vanderhye

[57] ABSTRACT

A system for mobile communication includes a number of base stations 10, 13, 16, 20, 23, 26 with users 30, 31, 45 and 46. Associated with each base station is an interface unit 10a, 13a, 16a, 20a, 23a and 26a which packetises voice information and includes header information concerning user and destination addresses. These interface units tracks the movement of the various user by passing control blocks from interface unit to interface unit. Packets are routed via routing block 40 or 41 and switches 50-52. The stored information within the base station interfaces allows movement from one base station to allow to be handled without call loss.

45 Claims, 6 Drawing Sheets

VPI = Virtual Path Identifier
VCI = Virtual Channel Identifier
HEC = Header Error Control

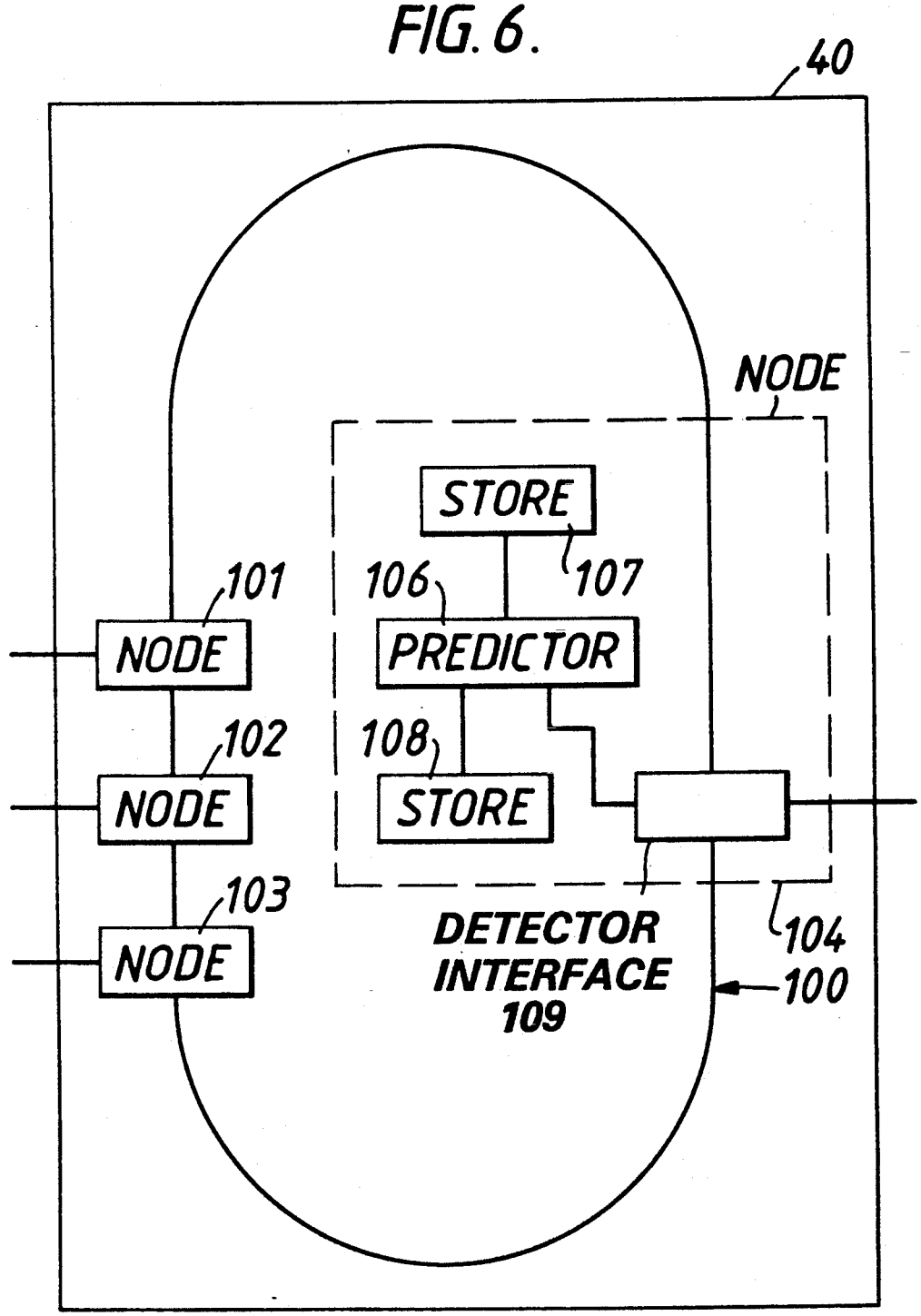

MOBILE COMMUNICATIONS SYSTEM

FIELD OF THE INVENTION

The invention relates to a mobile communications system and more particularly to the control and structure of such systems.

BACKGROUND AND SUMMARY OF THE INVENTION

In known digital cellular radio configurations a represented by FIG. 1, the system comprises a number of base stations 10, 13, 16 each of which are connected to a local exchange for mobile systems 11, 14 and 17 (i.e. mobile switching centres). The blocks 11, 14 and 17 are connected to the telco (e.g. British Telecom) network via switches 12, 15 and 18 which allow communication with geographically remote users via switches 22, 25 and 28, exchanges 21, 24 and 27 and base stations 20, 23, 26. To illustrate operation mobile telephone users 30, 31 are shown communicating with telephone users 46 and 45 respectively.

Users 30 and 31 happen to be using the same base station 13, and users 45 and 46 are using geographically adjacent stations 23. The active exchanges 14 and 24 will pass the voice information between the users and will also provide location control information which voice and control information will pass as packets of digital data through the telco network (which may include digital exchanges 15 and 25 with optical fibre interconnections).

When a user (say user 30) who is on the move passes closer to one of the base stations 16, the system has the capability to switch communications to the geographically closer base station and in practice the user's telephone will request the base station to accept transmission and this will be handled by the exchange 17 to ensure the call is routed to the correct destination. This will require the switch 18 to link with switch 25 (as shown by the broken line connection).

With increasing popularity, because of greater density of traffic use, the FIG. 1 configuration becomes saturated when the number of users either initiating a call or moving to other base stations is high.

In a Globecomm 88 paper titled 'The ATM Zone Concept' by Foster and Adams, a possible solution is described which employs a network architecture based on ATM (Asynchronous Time Multiplexing).

The present invention is concerned with a mobile system with improved capabilities which can make use of this zonal concept.

According to the invention there is provided a mobile communications system including: a plurality of base stations, routing means for connecting any base station to any other base station, a plurality of means each associated with one of said base stations for packetising control and packetising data signals and a plurality of means each associated with one of said base stations for tracking the current physical address within a packet switched network of a moving terminal to which control and/or data packets are to be passed and from which control and/or data packets are received.

Further according to the invention there is provided a method of controlling a mobile communications system having a plurality of base stations, the method comprising: providing a routing path for connecting any base station to any other base station, providing at each station packetising control information and packetising data information and providing at each station tracking of the current physical address within a packet switched network of a moving terminal to which control and/or data packets are to be passed and from which control and/or data packets are received.

BRIEF DESCRIPTION OF THE DRAWINGS

The invention will now be described by way of example with reference to the accompanying drawings in which:

FIG. 6 shows one configuration for the router 40 of FIG. 2.

DETAILED DESCRIPTION OF THE DRAWINGS

Figure 1:
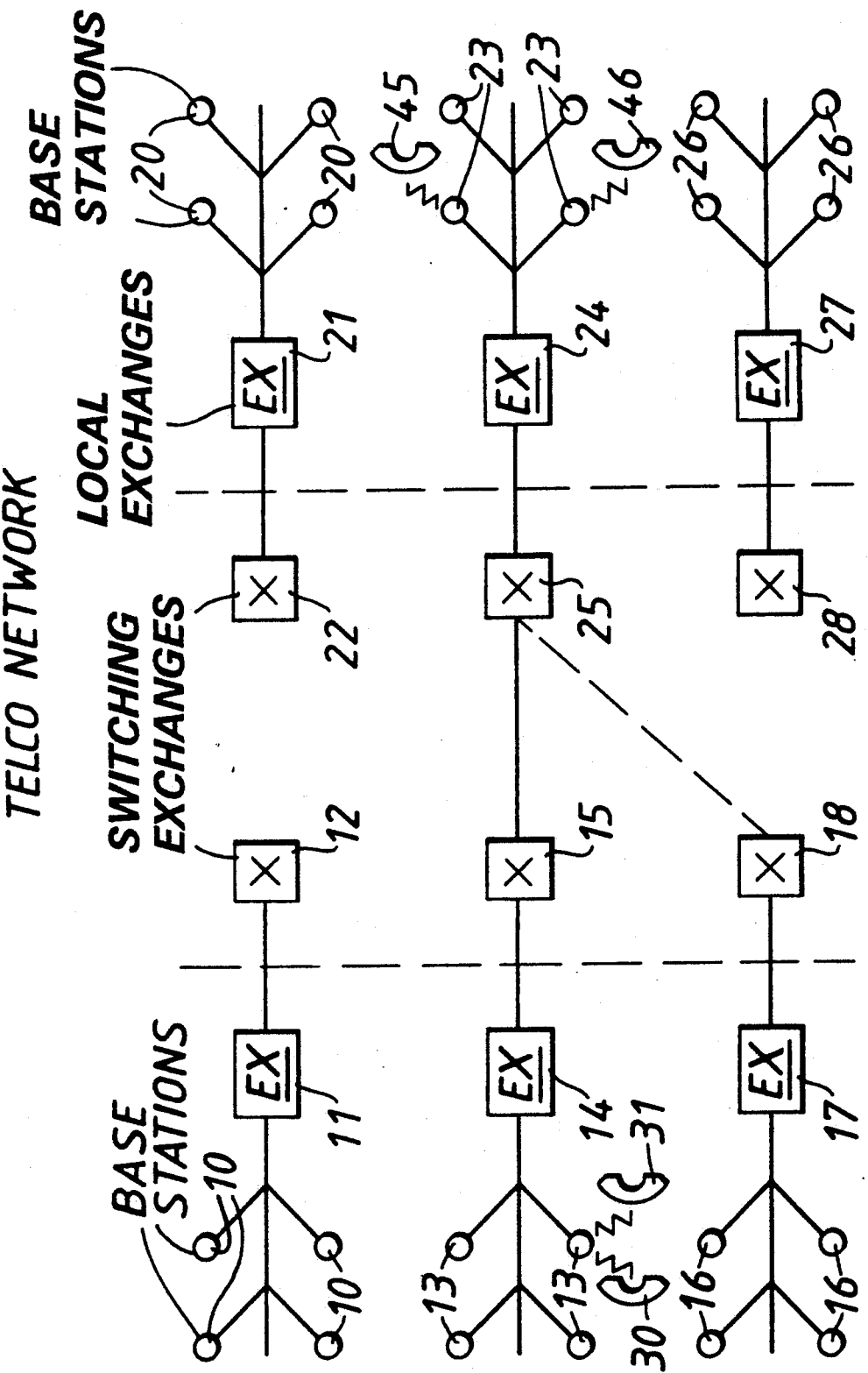
FIG. 1 shows a known mobile communication system
Figure 2:
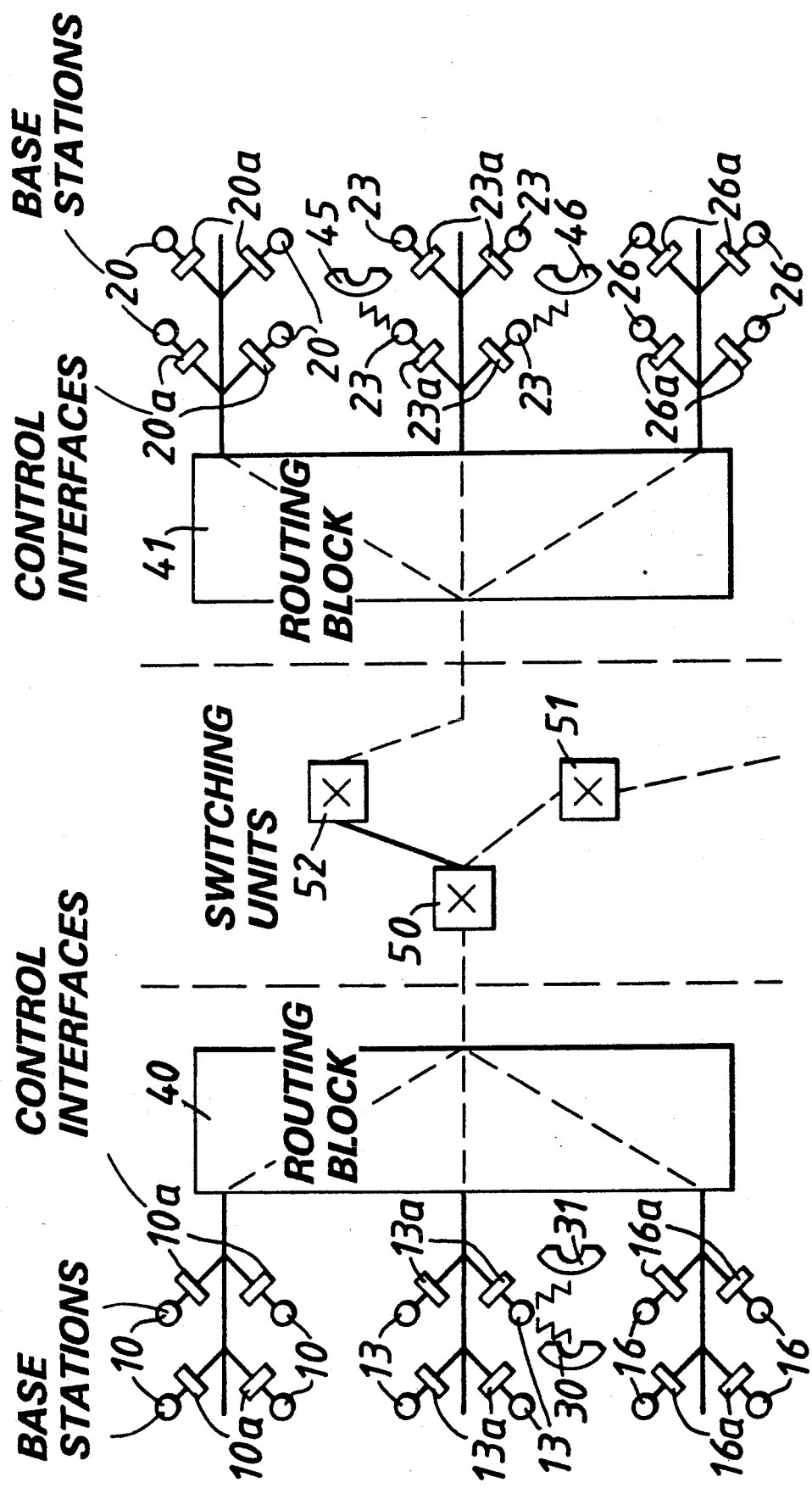
FIG. 2 shows an embodiment of the present invention

In FIG. 2 a system is described which removes the need of the exchanges 11, 14, 17, 21, 24, 27 of FIG. 1 and provides a distributed system of suitable intelligence to handle control information locally.

Associated with each base station is a control interface unit 10a, 13a, 16a, 20a, 23a, 26a. The users 30, 31 will communicate to the base station 13 and digital voice signals and other information therefrom will pass to the control interface 13a which will generate control information and packetised voice information which will pass via routing block 40 (which is a cross connector/concentrator) and switches 50 and 52 to routing block 41 (also a cross connector/concentrator) to base stations 23 via control interface 23a. In addition to generating control information, the interface 13a will generate a packetised voice destination address for each user to be received by the interface board 23a of the associated remote user. This destination address accompanying the voice packet allows the switches 50-52 to determine how to route the call to ensure receipt at the correct destination. As can be seen from FIG. 3 the voice/control information is carried in packet form with the destination address in the packet header. The switching effected by switches 50-52 is based solely on the destination address value.

Traffic flexibility is achieved by using Asynchronous Transfer Mode (ATM) techniques.

The connection of a number of base stations to an ATM switching node may be achieved using a passive optical network (PON) tree and branch structure. Other structures are not precluded, e.g. a ring structure. If each PON is assigned a single address for destination-routed ATM packets then, on arrival at the destination PON, such packets will be broadcast to all base stations attached to the PON. The further identification of which ATM packets are associated with a given base station comes from the connection number stored in a separate 16-bit field in each packet.

Figure 3:
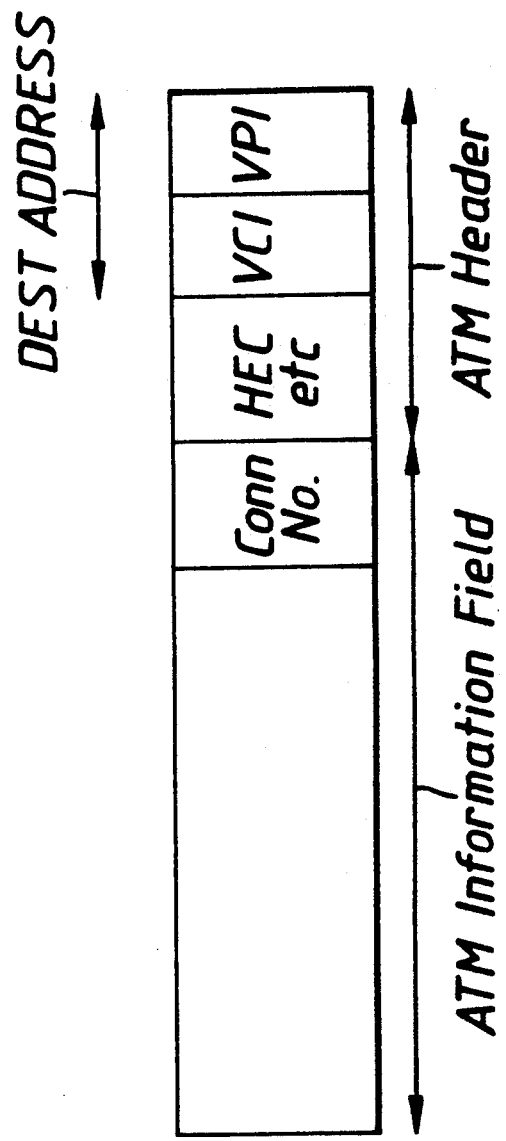
FIG. 3 shows the asynchronous transfer mode (ATM) packet structure.

As shown in FIG. 3 the ATM packets include an information field and a header. A connection number would be contained in the information field together with the voice information. In the header a header error control field (HEC) and a destination address field is provided. The destination address field may consist of two parts i.e. the Virtual Path Identifier (VPI) and the Virtual Channel Identifier (VCI). The VPI partitions any ATM packet stream into a number of separate payloads. It may be used to distinguish between payloads with differing quality of service requirements (i.e. different tolerances to packet loss rates and end-to-end delay) and has a limited capability to distinguish between payloads requiring separate routes. The size of the VPI field and its uses in the target B-ISDN (Integrated System Digital Network) are the subject of much current discussion in standards bodies but could typically be 8 bits (See also J. L. Adams 'The Virtual Path Identifier and its applications for Routeing and Priority of Connectionless and Connection Oriented Services', International Journal of Digital and Analog Cabled Systems. 1989).

To obtain destination addressing of hundreds-of-thousands of PONS located over the whole of the UK, for example, as would be required beyond the year 2000, it is proposed that a few VPI values are reserved (e.g. 8 values). Each VPI value represents one address 'block' of 64 k addresses as specified by the value in the 16-bit VCI field. The total address space, which is an integer multiple of 64 k, can be considered an ATM zone.

Half of the reserved VPI values are used to carry signalling information, and such packets will also carry a higher priority through the ATM network (i.e. such packets will be less likely to be discarded). This defines a signalling path in both directions between the two current destinations of the calling and called customers of any given connection. This signalling channel is configured to be a high capacity (broadband bit-rate) channel capable of transferring information quickly between the two ends (e.g. for a 1000 km route through the ATM network, the mean one-way delay including packetisation is about 10 ms). When not in use, the channel capacity can be temporarily assigned to other users according to known VPI multiplexing principles. Additional signalling paths exist between a base station and controllers elsewhere in the network, the paths being identified by suitable signalling VPI values plus particular VCI values. The remaining reserved VPI values are used to carry voice packets base station-to-base station with no change to the packet header.

PON destination addresses operate as group addresses, i.e. the address assigned to each PON is also valid for all other PON's which have adjacent cells. At the ATM cross-connect (blocks 40 and 41 of FIG. 2) ATM packets carrying a group address are automatically broadcast to all the relevant PONS.

The other aspects of packet handling can be based on techniques disclosed in European Patent Publication No. 168265.

The purpose of router 40 is to allow concentration of a number of geographically adjacent base stations 10, 13 and 16 to pass to the one switch 50 and also to act as a cross connector to allow speech and information destined for base stations 13 to pass also to base stations 10 and 16. This allows a user 30 for example to move away from base station 13 towards 16 and that base station to take over the communication role without loss of the call occuring. Block 40 would be replicated using base stations 16 as the upper set of base stations and further base stations (not shown) would be connected to this to deal with movement away from 16 to lower stations.

Hence the system is flexible enough to deal with callers moving from one base station to another within the duration of the call and the interfacing has the capability of mapping the locations of the remote users to ensure correct routing of the calls. The cell size normally used for mobile communications can conveniently be reduced to mini-cells by using this technique (e.g. 100 meters radius) so that the number of users per cell falls to reduce congestion in high traffic demand areas. This increase in the number of cells resulting therefrom is not a disadvantage as regards switching because of the simplified switching/routing mechanisms proposed and the faster tracking features of destination addressing.

The configuration of FIG. 2 described above provides base station-to-base station control of tracking. This removes processing load from a central controller and hence removes a potential processing bottleneck particularly as the system evolves towards the greater use of microcells. As either customer moves the ATM Zone automatically provides a new voice path and a new path for the transfer of signalling information. There is minimal delay and minimal processing load involved in setting up a different path since the route to any given destination is already pre-determined. The capacity previously used on the 'old' path and no longer required is automatically made available to other users according to VPI multiplexing principles.

Destination addressing also simplifies the data transfer for connectionless services as, in mobile terminals.

Figure 4:
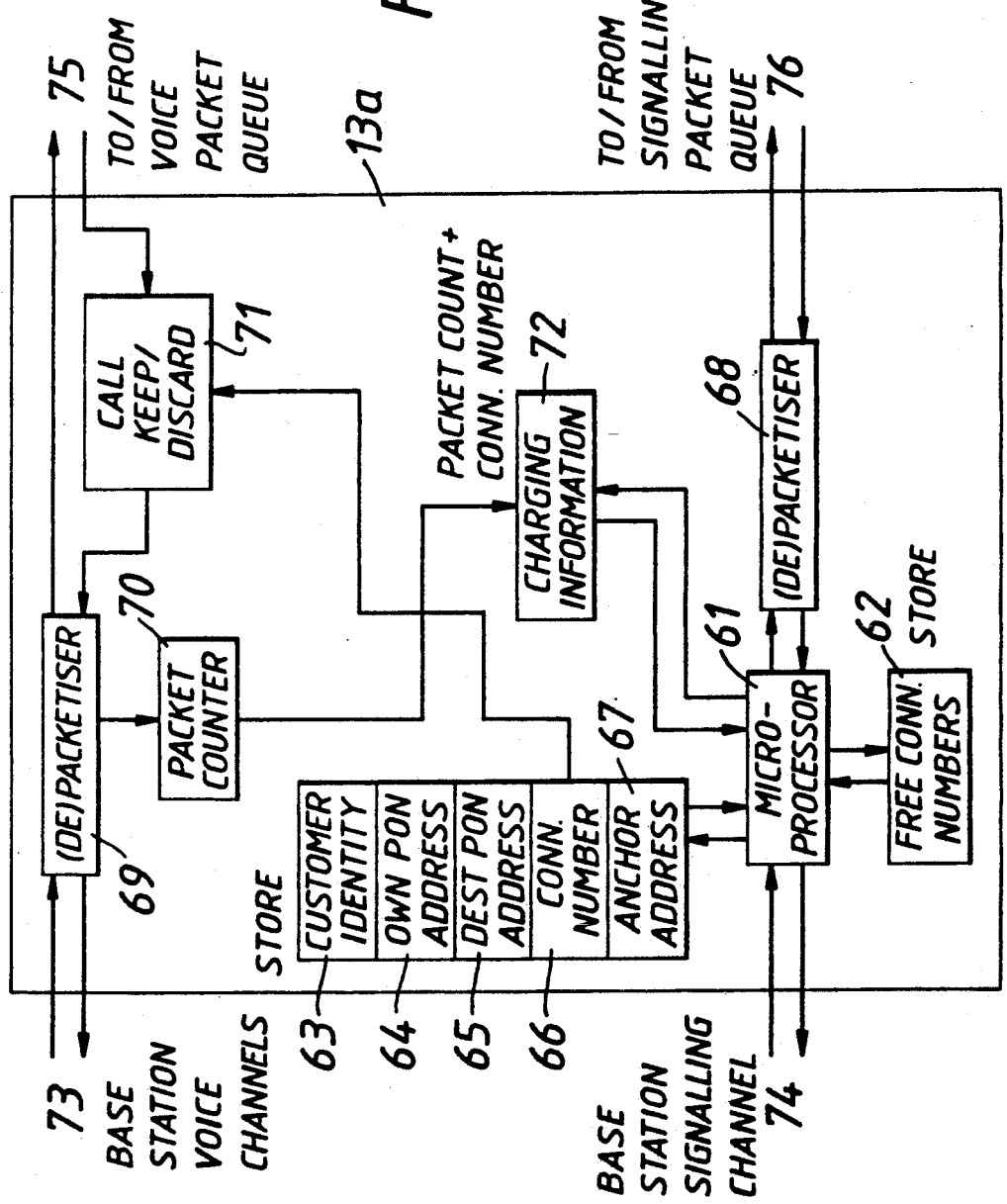
FIG. 4 shows the base station and associated interfacing of FIG. 2 in more detail.

A configuration for dealing with the information at base station level is shown in FIG. 4.

One of the base station interface units 13a is shown which has a base station connection 73 for voice channels and a connection 74 for the base station signalling channel. A connection 75 is provided for voice packets and a connection 76 for signalling associated with the packets which are connected to the routing block 40. The connection 73 passes within the interface 13a to a packetiser/depacketiser 69 which will take digital voice information from the voice channels and packetise them in block 69 for passage to the voice packet queue within router 40. A packet counter 70 will count outgoing packets and provide the count and the connection number associated with the packets to allow charging information to be calculated in block 72 under the control of microprocessor 61. The microprocessor 61 will also have access to base station signalling information from connection 74 and packetised signalling information from the remote stations via packetiser-depacketiser 68. The microprocessor will route information on the free connection numbers for store 62 and customer identify information for store 63. It will also deal with the terminal's own PON address for store 64, the destination PON address for store 65, the connection number for store 66 and the 'anchor' address for store block 67. The connection number store 66 will determine, dependent on stored information, whether the packetised incoming information is discarded by depacketiser 69 or not, to prevent unwanted packets being retained.

Thus for each mobile terminal currently associated with a particular cell/microcell, all of the base stations within its group address will store that terminal's current PON address, current destination PON address, and connection number, together with the 'anchor' controller address (explained below). This information is loaded into tables at each base station by a broadcast message from the opposite end, i.e. each end of a call in progress is responsible for updating the group tables of the other end.

The mechanism for updating group tables is triggered whenever a terminal moves to an adjacent cell, minicell, or microcell. In this case the new base station will send a signalling message to the address of the destination PON, containing the customer identity at both ends, the 'anchor' controller address, the destination PON address, and information on the updated near-end PON address and connection number, if the values of these parameters have changed. In response the base station associated with the terminal at the other end will send its current values of the same list of parameters regardless of whether there have been any changes or not.

Connection numbers need to be changed whenever there is a change in the PON address. Connection number blocks containing free connection numbers can be pre-assigned to each base station in a PON group so that the selection of a new connection number can be made autonomously by any base station as the terminal moves from PON group to PON group.

ATM packetisers at the base stations automatically load the destination PON address into the headers of voice packets. This is the only action required to route the packet. Packet counters are used at the base stations for the purposes of charging. On moving to a new base station, the 'old' base station sends charging information using ATM signalling packets with a destination address set the 'anchor' controller. This controller is the only fixed point in the architecture, hence the name 'anchor'. Many replicas of the 'anchor' controller exist within the Zone, and one of them becomes associated with a given call at the time of call set-up. Its identity then remains fixed throughout the call. Using the Zone concept an ATM route always exists to any 'anchor' controller from any base station.

Maintenance and policing may also be included as control functions. Technical equipment compatible with the GSM (Groupe Speciale Mobile—pan European network) System may be used.

Figure 5:
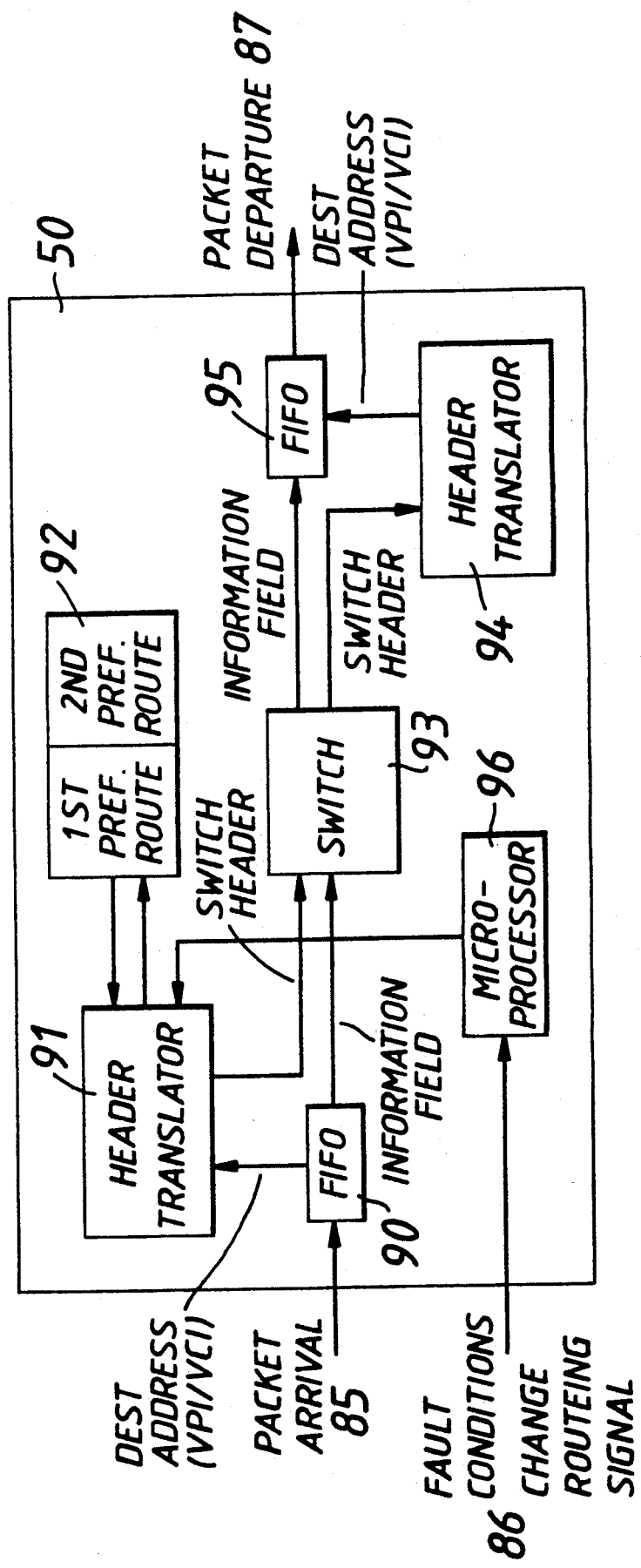
FIG. 5 shows the network switches in FIG. 2 in more detail.

As explained with relation to FIG. 2, the switches 50-52 are capable of handling the information generated by the base stations and associated interface and these in practice would be part of a larger network of switches (typically nationwide). The switches could be configured as shown in FIG. 5.

One of the switches 50 is shown with an incoming packet connection 85 for receiving packets from router 40 or from another switch 51. A fault condition input 86 is also provided to indicate faults on any given route. Packets from the switch 50 are available for passage at connection 87.

Arriving packets within switch 50 pass to a first-in, first-out store (FIFO) 90. Destination address information within the packet header is available to the header translator 91. This information includes the VPI and VCI numbers. This information is used by the header translator 91 in association with the preferred route block 92 to determine from the stored route information what is the most preferential route to be chosen and this switch header information is made available to the main switch block 93 which switches the information field from the FIFO 90 in appropriate manner. After switching, the information field passes to FIFO 95. The switch header information passes to a header translator 94 where it is converted into a destination address with VCI and VPI components. It is then available for transmission on from connection 87.

In the event of a route fault occurring, this is detected by microprocessor 96 which instructs translator 91 to choose an alternative preferred route for switching.

Thus ATM cross-connects and ATM exchange equipment is configured to handle the addressing mechanisms provided by the base stations and is compatable for Zonal operation. This means that the destination address is preserved from inlet to outlet of the switch and hence is preserved over the route from end-to-end. At the switch inlet 85 the VPI and VCI numbers are used to reference special routing tables within block 92 for Zonal packets and an internal routing label is created. This label has sufficient room to store the destination address as well as containing information to route the ATM packet to the correct outlet.

As explained, the routing tables can take account of fault conditions by storing 'first preferred' and 'second preferred' outlets together with the appropriate routing tags for internal switch operation. An automatic fault alarm would cause the routing tables to switch to the second preferred outlet if appropriate.

The routing tables are the only resource which is special to the mobile users and the same ATM switches can be used for other B-ISDN services, if required.

Although the system has been described in terms of broadcasting information packets to all adjacent base stations to ensure mobile users can operate without cut-off, in an alternative embodiment a predictor mechanism can be employed to predict from the current and previous address information the movement path of the user to restrict the number of adjacent stations copied or broadcast, to reduce bandwidth requirements.

Thus as shown in FIG. 6, the router 40 could be configured as a ring mechanism 100 with a number of nodes 101-104 capable of handling packetised information. Within node 104 is a predictor block 106 which includes a store 107 for connection numbers and a store 108 for destination addresses. Dependent on changes in user location the predictor determines which base stations are appropriate to currently receive the packets dependent on the movement pattern and adds instructions thereon to the packetised information to allow this to pass round the ring to instruct the other nodes 101-103 whether to accept or discard packets received.

Information for use by the predictor 106 could be provided within the base station interface units, see unit 13a for example and transmitted to the predictor 106 via detector interface 109. Customer identity information for example is available from block 63 and changes can be passed via the microprocessor 61 for use by the predictor 106.

Although the system has been described generally as handling packetised voice information (i.e. voice data), other packet information (e.g. computer data) could be handled.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A mobile communications system including:
a plurality of base stations,
routing means for connecting any base station to any other base station, a plurality of means each associated with a respective one of said base stations, for packetising control signals and packetising data signals, and a plurality of means each associated with a respective one of said base stations for tracking the current physical location address within a packet switched network of a moving terminal to which control and/or data packets are to be passed and from which control and/or data packets are received.

2. A system as in claim 1, wherein the tracking means associated with each base station includes means for generating origination base station physical location address and destination base station physical location address information to accompany user information, means for enabling any base station to determine which route information therefrom is to take dependent on said destination information and means for updating location or destination information on a mobile user.

3. A system as claimed in claim 2 where the means for determining the information routes includes means for retaining remote user's base station address information, means for retaining local user's base station address information and means for generating packetised information signals thereon to accompany said user information.

4. A system as claimed in claim 3 wherein the retaining means includes means for retaining packetised information signals on adjacent base stations to enable a local user to change base stations without loss of connection.

5. A system as claimed in claim 3 or 4 wherein remote user destination address generator means is provided and includes means to generate a first portion indicative of path identification and means to generate a second portion indicative of channel identification, for inclusion on the packet header.

6. A system as claimed in claim 5 wherein the path identification generator means is configured to generate a near end broadcasting network address and the channel identification generator means is configured to generate a near end connection number.

7. A system as claimed in any one of claims 2, 3 or 4 wherein the tracking means includes generator means for updating a remote base station with information on the customer identity of both customers communicating via the remote and local base stations.

8. A system as claimed in claim 7 wherein the tracking means includes a controller and wherein the tracking means includes generator means for updating a remote base station with controller address information.

9. A system as claimed in claim 8 including further generator means for generating packetised charging information signals to be sent to said controller.

10. A system as claimed in claim 7, including means for detecting updated information from a remote tracking means and means for responding to said information to generate updated information on a local associated terminal identified by the received updated information.

11. A system as claimed in claim 9 including detector means for detecting that said moving terminal has moved to a new broadcast address and means responsive thereto for generating a new near end connection number whenever a broadcast address change has been detected.

12. A system as claimed in claim 11, including means for holding a set of free connection numbers for use by moving terminals and means for selecting a free connection number from the set of pre-assigned connection numbers.

13. A system as claimed in claim 11, including means for detecting that a terminal is no longer at the near end base station to initiate operation of said generator means to supply charging information.

14. A system as claimed in claim 13, wherein counter means are provided to count packets and the count provided thereby is output whenever the detector means detects that said terminal is no longer at the near end base station, said output being connectable to said charging generator means to allow charging to be calculated.

15. A system as claimed in claims 1, 2, 3 or 4 wherein the means for packetising includes selector means for selecting one of a plurality of means for packetising at a remote location for receiving said charging information and initial path selection.

16. A system as claimed in claims 1, 2, 3 or 4 wherein the means for packetising includes means for generating voice packets and means for inserting a connection number and designation base station information therein.

17. A system as claimed in claims 1, 2, 3 or 4 wherein the routing means includes means for detecting address information accompanying packet information to route packets as determined by detected destination addresses.

18. A system as claimed in claim 17 wherein the means for detecting address information includes means for generating an internal routing signal to accompany the address information to ensure correct routing within the routing means.

19. A system as claimed in claim 18 wherein the means for generating a routing signal is configured to generate more than one routing signal to route the information in dependence on route availability.

20. A system as claimed in claim 19 including means for detecting fault conditions on a preferred route and means for selecting an alternative preferred route thereafter.

21. A system as claimed in claims 1, 2, 3 or 4 wherein the routing means comprise ATM switches configured to handle packetised information on an optical network.

22. A system as claimed in claims 1, 2, 3 or 4 including interconnection means provided to connect a plurality of base stations to the routing means to allow a number of adjacent base stations to each receive incoming information therefrom.

23. A system as claimed in claim 22 wherein the interconnection means includes means for predicting movement patterns of the users from address information to limit the number of adjacent base stations receiving identical information dependent on predicted user movements to reduce bandwidth requirements.

24. A system as claimed in claim 23 wherein the interconnection means includes detector means connected to a group of base stations to intercept information for transmission to one or more of the base stations dependent on accompanying control information provided by the predictor means.

25. A system as claimed in claim 22 wherein the interconnection means includes a communications ring connecting a plurality of base station groups.

26. A method of controlling a mobile communication system having a plurality of base stations, the method comprising:
  providing a routing path for connecting any base station to any other base station, providing at each said base station packetising control information signals and packetising data information and at each said base station tracking the current physical address location within a packet switched network of a moving terminal associated therewith to which control and/or data packets are to be passed and from which control and/or data packets are received.

27. A method as claimed in claim 26, wherein the tracking step includes generating origination base station physical location address information and designation base station physical location address information to accompany user information, determining which route information therefrom is to take dependent on said destination information, and updating location or destination information on a mobile user.

28. A method as claimed in claim 27 wherein the route determining step includes retaining remote user's base station address information, retaining local user's base station address information and generating packetised information thereon to accompany said user information.

29. A method as claimed in claim 28 wherein the retaining step includes retaining packetised information on adjacent base stations to enable a local user to change base stations without loss of connection.

30. A method as claimed in claim 28 or 29 wherein the destination address generation step includes generating a first portion indicative of path identification and generating a second portion indicative of channel identification, for inclusion on the packet header.

31. A method as claimed in claim 30 wherein the path identification generating step includes generating a near end broadcasting network address and the channel identification generation step includes generating a near end connection number.

32. A method as claimed in claims 26, 27, 28 or 29 wherein the tracking step includes updating a remote base station with information on the customer identity of both customers communicating via the remote and local base stations.

33. A method as claimed in claim 32 including the steps of detecting updated information resulting from tracking at a remote station and responding to said information to generate updated information on a local associated terminal identified by the received updated information.

34. A method as claimed in claim 31 including the steps of detecting that a moving terminal has moved to a new broadcast address and generating a new near end connection number whenever a broadcast address change has been detected.

35. A method as claimed in claim 34, including the steps of holding a set of free connection numbers for use by moving terminals and selecting a free connection number from the set of pre-assigned connection numbers.

36. A method as claimed in claim 34, including detecting that a terminal is no longer at the near end base station and in response thereto initiating operation of a charging information generation step.

37. A method as claimed in claim 36, including counting packets and outputting the packet count whenever the detection step determines that the terminal is no longer at the near end base station to allow said charging to be calculated.

38. A method as claimed in claims 26, 27, 28 or 29 wherein the packetising step includes generating voice packets and inserting a connection number and destination base station information therein.

39. A method as claimed in claims 26, 27, 28 or 29 wherein the routing path step includes detecting address information accompanying packet information to route packets as determined by detected destination addresses.

40. A method as claimed in claim 39 wherein the address information detection step includes generating an internal routing signal to accompany the address information to ensure selection of the correct routing path.

41. A method as claimed in claim 40 wherein the routing signal generation step is configured to generate more than one routing signal to route the information in dependence on route availability and fault detection is provided for detecting fault conditions on a preferred route for allowing selection of an alternative preferred route thereafter.

42. A method as claimed in claims 26, 27, 28 or 29 wherein the routing path selection step is provided using Aynchrous Transfer Mode techniques to allow packetised information to be routed on an optical network.

43. A method as claimed in claims 26, 27, 28 or 29 including interconnecting a plurality of base stations to the routing path to allow a number of adjacent base stations to each receive incoming information therefrom.

44. A method as claimed in claim 43 wherein the interconnecting step includes predicting movement patterns of the users from address information to limit the number of adjacent base stations receiving identical information dependent on predicted user movements to reduce bandwith requirements.

45. A method as claimed in claim 44 wherein the interconnection step includes detecting at a group of interconnected base stations information for transmission to one or more of the base stations dependent on accompanying control information provided by the prediction step.

* * * * *